D. ALLEN.
STEERING DEVICE.
APPLICATION FILED JULY 24, 1914.

1,144,278.

Patented June 22, 1915.
2 SHEETS—SHEET 1.

Witnesses
J. T. L. Wright
P. M. Smith

Inventor
David Allen
By Victor J. Evans
Attorney

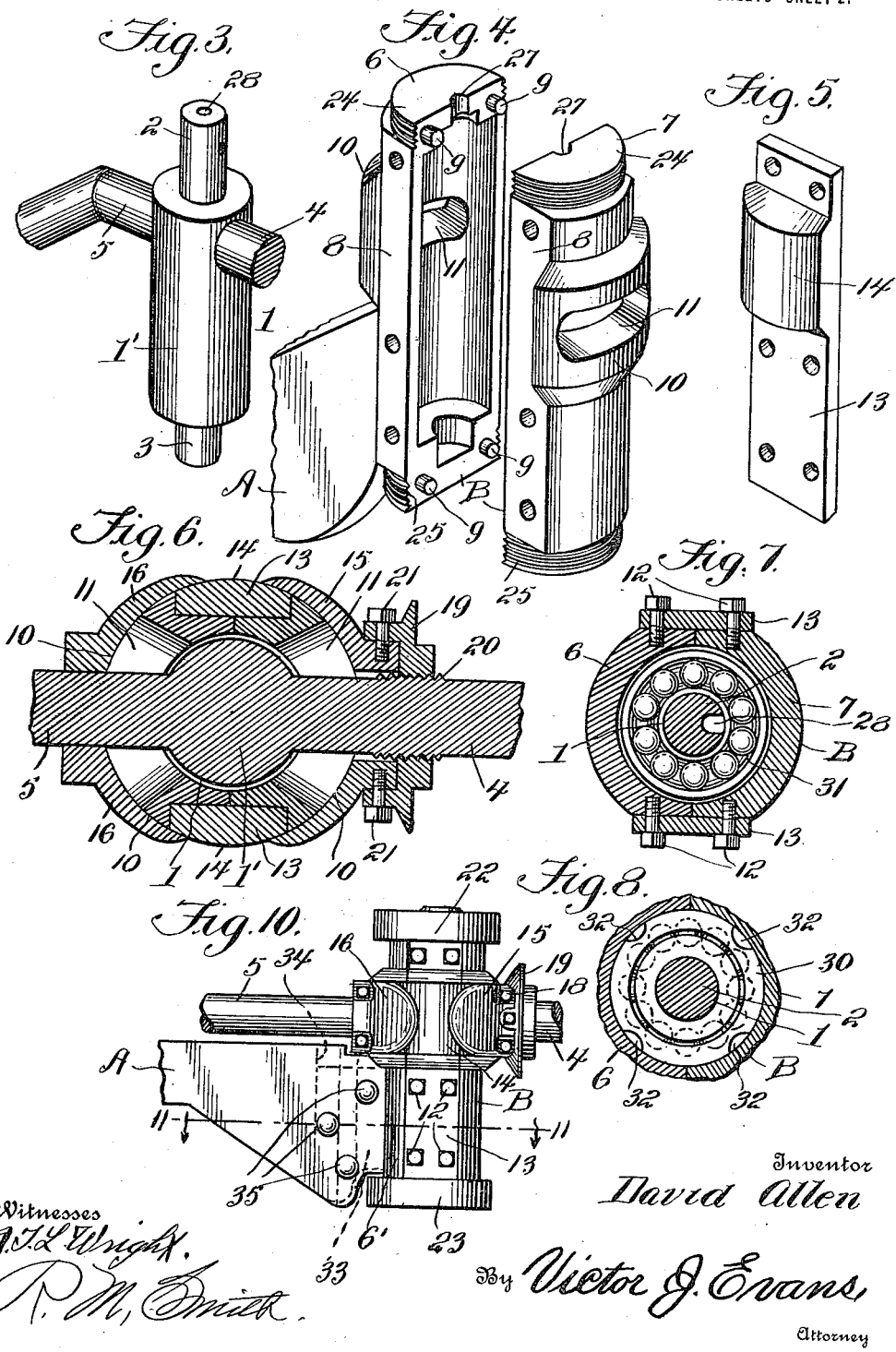

UNITED STATES PATENT OFFICE.

DAVID ALLEN, OF TRENTON, NEW JERSEY.

STEERING DEVICE.

1,144,278.  Specification of Letters Patent.  Patented June 22, 1915.

Application filed July 24, 1914. Serial No. 852,966.

*To all whom it may concern:*

Be it known that I, DAVID ALLEN, a citizen of the United States, residing at Trenton, in the county of Mercer and State of New Jersey, have invented new and useful Improvements in Steering Devices, of which the following is a specification.

This invention relates to steering devices for motor cars, the object in view being to greatly strengthen the connection between the axle and steering wheel spindles and thereby increasing the safety and reliability of this part of a motor car while also enabling efficient anti-friction bearings to be employed which greatly improve the easy turning quality of the machine as a whole.

A further object of the invention is to so construct the steering device as to practically exclude all foreign matter from the steering knuckle, incidentally increasing the life and durability of the device and insuring proper working conditions at all times.

With the above and other objects in view, the invention consists in the novel construction, combination and arrangement of parts, as herein described, illustrated and claimed.

Figure 1:
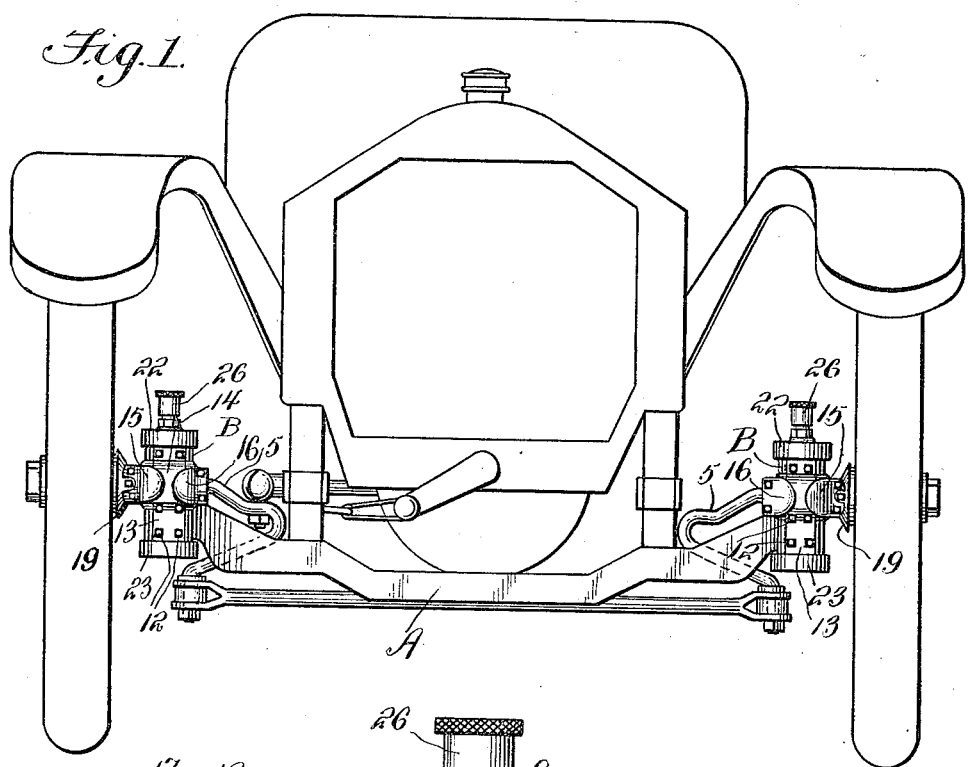
Figures 2, 9, 11:
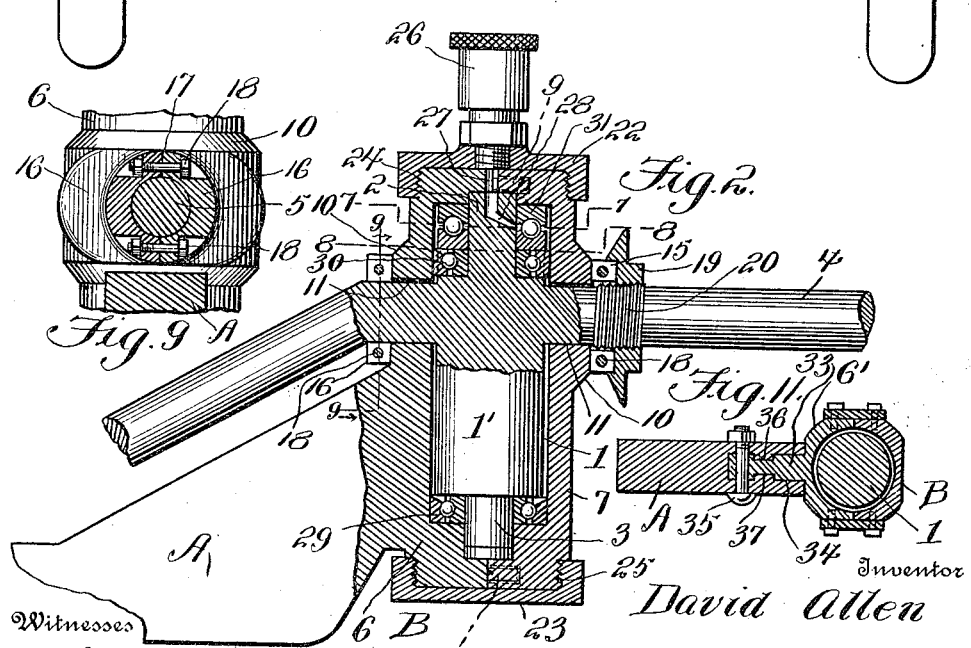

In the accompanying drawings:—Figure 1 is a front elevation of an automobile showing the improved steering device applied thereto. Fig. 2 is an enlarged vertical diagrammatical section through one of the knuckle housings, showing one of the knuckles partly in section and partly in elevation. Fig. 3 is a detail perspective view of the steering knuckle showing portions of the knuckle arm and spindle. Fig. 4 is a segregated perspective view of the housing for the steering knuckle, showing also a portion of the axle. Fig. 5 is a detail perspective view of one of the tie-plates. Fig. 6 is a horizontal section taken in line with and diametrically of the steering arm and spindle, showing the knuckle, housing and dirt guards in cross section. Fig. 7 is a cross section on the line 7—7 of Fig. 2. Fig. 8 is a cross section on the line 8—8 of Fig. 2. Fig. 9 is a vertical cross section on the line 9—9 of Fig. 2. Fig. 10 is a view in elevation showing a modification in the connection between the steering knuckle and the axle whereby said parts are separately connected. Fig. 11 is a cross section on the line 11—77 of Fig. 10.

Referring to the drawings A generally designates the front axle of a motor car and B generally designates the steering knuckle housing of this invention.

The knuckle proper, indicated at 1 and best illustrated in detail in Fig. 3, comprises a substantially cylindrical body 1' provided with top and bottom journals 2 and 3, respectively, the body of the knuckle having extending laterally from one side thereof the wheel spindle 4 and having extended from the opposite side thereof the knuckle arm 5 by means of which the knuckle is turned to correspondingly turn the steering wheel journaled on the spindle 4.

By reference to Fig. 4 it will be noted that the housing B comprises the two main sections 6 and 7 each of which is substantially semi-cylindrical in cross section but provided at opposite sides with flat faces 8 the purpose of which will appear. The section 6 of the housing is provided on its inner face with dowel pins 9 while the opposite section 7 is provided with holes or sockets to receive said dowel pins enabling the two main sections 6 and 7 to be quickly brought into proper relation to each other. Each of the housing sections 6 and 7 is also provided exteriorly with a projecting and semi-cylindrical bearing face 10 against which one of the dirt guards hereinafter referred to bears and each of the bearing faces 10 is intersected by a horizontally extending slot 11. The slot 11 in one section has the spindle 4 passed therethrough while the slot 11 of the other housing section receives the knuckle arm 5 of the spindle. The construction referred to is clearly shown in the assembled view, Fig. 6, wherein it will be seen that the slots 11 will permit the horizontal swinging movement of the spindle 4 and steering arm 5.

Secured by cap screws 12 or their equivalent to opposite sides of the main housing sections 6 and 7 are tie-plates 13 one of which is illustrated in detail perspective in Fig. 5. Each of these housing plates 13 is provided with a curved bearing face 14 struck on the same radius as the bearing faces 10 above referred to and forming complemental portions or continuations of said bearing faces 10. The bearing faces 10 and 14, taken collectively, form a complete cylindrical bearing surface against which operate two dirt guards 15 and 16 as shown, for example, in Fig. 6. Each of the dirt guards 15 and 16 is preferably made in two sections as shown in Fig. 9, said sections meeting on a line 17 diametrical to the spindle 4 or arm 5 as the case may be, the said sections being fastened together and clamped upon the respective member 4 or 5 by means of bolts 18 or the equivalent thereof. This enables the dirt guards to be applied to and removed from the members 4 and 5 and also adjusted into the proper working relation to or contact with the cylindrical bearing faces 10 and 14 above referred to.

19 designates a wheel hub abutment collar which is screwed on a threaded portion 20 of the spindle 4, against the adjacent dirt guard 15 to which it may be fixedly connected by means of cap screws 21 or the equivalent thereof.

In addition to the tie-plates 13, top and bottom flanged caps 22 and 23 are screwed upon the threaded and reduced top and bottom ends 24 and 25 of the main housing sections 6 and 7 as shown in the assembled sectional view, Fig. 2. These caps serve to lock the housing sections together and the top cap 22 is preferably equipped with a grease cup 26 the grease from which is forced downwardly through a passage 27 formed in the meeting faces of the housing sections 6 and 7 and through a registering passage 28 of angular shape, formed in the upper journal 2 of the knuckle and leading off to one side of said journal within the knuckle housing. Encircling the lower journal 3 of the knuckle is a side thrust ball bearing 29 while a similar side thrust bearing 30 extends around the upper journal 2. Above the last named side thrust bearing 30 is arranged an end thrust ball bearing 31 which forms the main support for the load, the two side thrust and one end thrust bearings providing for an easy turning movement of the steering device without in any way impairing the strength of the construction described. Referring to Fig. 8 it will be noted that the upper side thrust bearing 30 is provided in the outer side of the outer ball race thereof with vertically extending notches or grooves 32 to provide for the grease or other lubricant passing downwardly around the steering knuckle and reaching the lower side thrust bearing 29.

In some cases it may be desirable to form the knuckle housing B separate from the axle A. This may be accomplished as illustrated in Figs. 10 and 11, one of the main sections 6' of the knuckle housing being provided with a tenon 33 while the extremity of the axle is provided with a mortise 34 to receive said tenon, the mortise 34 extending from top to bottom of the extremity of the axle so as to enable the tenon 33 to be slid vertically therein. When the tenon is in place in the mortise, one or more bolts 35 are inserted through the parts to hold them in a fixed relative position as clearly indicated in Figs. 10 and 11. It is also preferred to provide one of said members with vertically extending ribs 36 and the other member with grooves 37 to receive said ribs, the ribs 36 forming a more reliable and better braced connection between the axle and knuckle housing.

From the foregoing description taken in connection with the accompanying drawings it will be seen that an unusually strong, safe and reliable connection is provided between each of the steering knuckles and the axle. Under the construction universally employed in automobiles of the present day, the steering connection at the point referred to depends on a pin or bolt which usually does not exceed one-half of an inch in diameter. Should this bolt brake, as it frequently does, serious accidents are liable to happen. The construction contemplated in this invention does away with this insecure and unreliable pin or bolt and in lieu thereof provides a stout, heavy and strong steering knuckle connection, the sections of the knuckle housing being firmly secured in fixed relation to each other by means of the tie-plates and end caps hereinabove particularly described. The construction also provides for the efficient exclusion of all foreign matter from the knuckle bearing.

What I claim is:—

1. The combination with the axle of a motor car, of a steering knuckle housing on the end thereof, said housing embodying two main sections separable along a vertical diametrical line and each provided with a substantially semi-cylindrical external bearing face intersected by a horizontal slot, tie-plates fastened to opposite sides of said housing and extending across the meeting edges of said housing and each provided with a curved bearing face which forms a complemental portion of said semi-cylindrical faces, a steering knuckle journaled in said housing and provided with a wheel spindle passing through one of said slots and a knuckle arm passing through the other slot, and dirt guards secured to said spindle and knuckle arm and embodying concaved bearing faces which work in contact with the external bearing faces on the housing sections and tie-plates.

2. The combination with the axle of a motor car, of a steering knuckle housing on the end thereof, said housing embodying two main sections separable along a vertical diametrical line and each provided with a substantially semi-cylindrical external bearing face intersected by a horizontal slot, tie-plates fastened to opposite sides of said housing and extending across the meeting edges of said housing and each provided with a curved bearing face which forms a complemental portion of said semi-cylindrical faces, flanged caps threaded on the upper and lower ends of said housing and serving to lock the housing sections together, a steering knuckle journaled in said housing and provided with a wheel spindle passing through one of said slots and a knuckle arm passing through the other slot, and dirt guards secured to said spindle and knuckle arm and embodying concaved bearing faces which work in contact with the external bearing faces on the housing sections and tie-plates.

In testimony whereof I affix my signature in presence of two witnesses.

DAVID ALLEN.

Witnesses:
HENRY R. J. CEASER,
F. VAN DOREN.

Copies of this patent may be obtained for five cents each, by addressing the "Commissioner of Patents, Washington, D. C."